Nov. 28, 1967   H. O. SCHOLL ETAL   3,354,620
DUST COLLECTOR APPARATUS
Filed Jan. 15, 1965
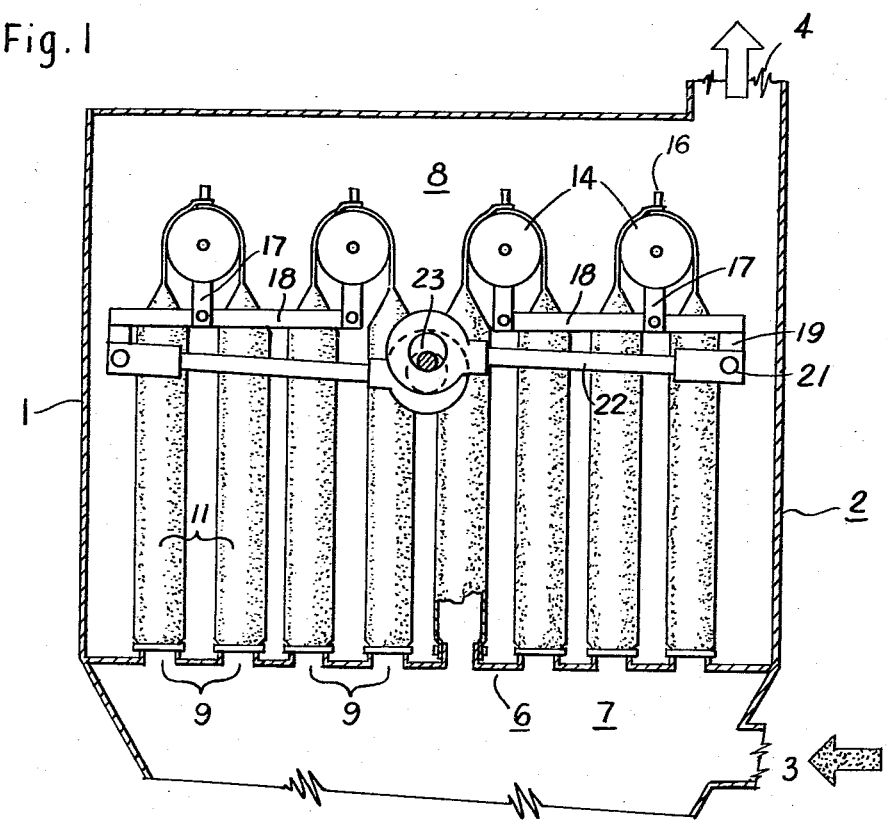
Fig. 1
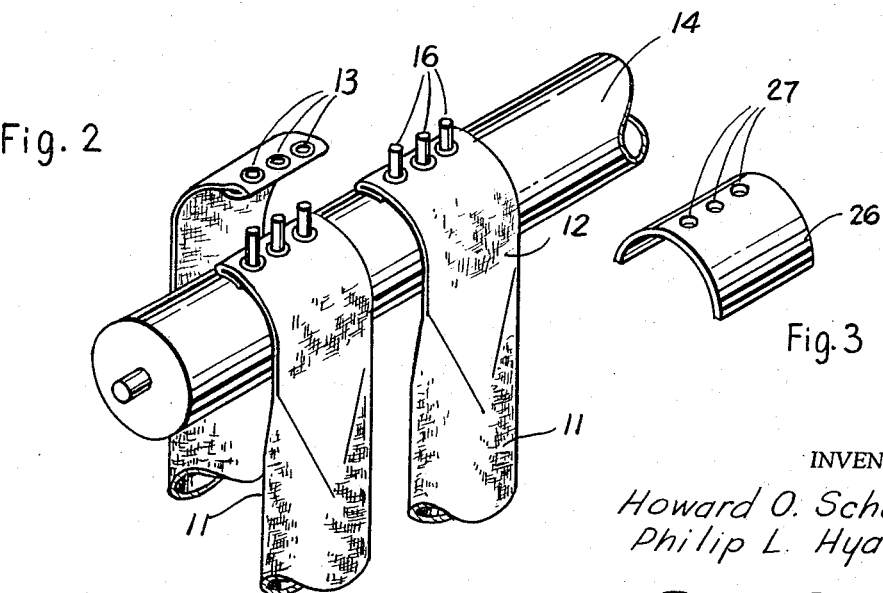
Fig. 2
Fig. 3
INVENTORS
Howard O. Scholl
Philip L. Hyatt
Ralph R. Brick
ATTORNEY United States Patent Office 3,354,620
Patented Nov. 28, 1967

3,354,620
DUST COLLECTOR APPARATUS
Howard O. Scholl, Louisville, and Philip L. Hyatt, Prospect, Ky., assignors to American Air Filter Company, Inc., Louisville, Ky., a corporation of Delaware
Filed Jan. 15, 1965, Ser. No. 425,890
4 Claims. (Cl. 55—304)

ABSTRACT OF THE DISCLOSURE

A shaker arrangement for a plurality of vertically extending filter bags including an oscillatable circular bag support means extending above the bags and dimensioned to shake the bags only in a substantially lineal up and down shaking motion so as to permit optimum contaminant removal with minimum re-entrainment.

---

The present invention relates to dust collector apparatus and more particularly to an improved arrangement for dislodging contaminant dust particles which have accumulated on the surfaces of dust separating filter bags.

Various arangements have been utilized in the past to free accumulated contaminants from the surfaces of filter bags. One of the more well-known and long-established ways to accomplish contaminant removal has been the utilization of bag shaker mechanism. For the most part, bag shaker mechanisms of the past have been complex and expensive in construction and maintenance, requiring an extensive number of parts and causing violent bag shaking with concomitant bag wear and contaminant re-entrainment.

The present invention avoids the disadvantages of past filter bag shaking mechanisms, providing an improved arrangement which is economical and straightforward in construction, operation and maintenance, requiring a minimum number of parts and, at the same time, providing a gentle, substantially lineal shaking motion to the bag to permit optimum contaminant removal with minimum re-entrainment.

Various other features of the present invention will become obvious to one skilled in the art upon reading the disclosure set forth hereinafter.

More particularly, the present invention provides a dust collector apparatus comprising: a filter bag housing including upstream dirty gas inlet means and downstream clean gas outlet means; horizontal partition means extending transverse the housing to divide the housing into a dirty gas plenum communicating with the dirty gas inlet means of the housing and a clean gas plenum communicating with the clean gas outlet means of the housing, the partition means having at least one pair of spaced rows of spaced and aligned apertures between the dirty gas and clean gas plenums; at least one pair of spaced rows of spaced and aligned filter bags vertically disposed in the clean gas plenum in spaced, parallel relationship, the filter bags having closed upper end portions and open lower end portions connected to the apertures of the partition to communicate with the dirty gas plenum; bag support means having a central longitudinal axis extending in a plane parallel to and intermediate the pair of spaced rows of filter bags above the closed upper ends of the bags, the bag support means having a cross-sectional contour wherein at least the uppermost half thereof is of cylindrical shape with a maximum chord substantially equal to the distance between center lines of the rows of apertures in the partition; means to connect the closed upper portions of the pair of spaced rows of filter bags to the support means along the uppermost half thereof; and means to oscillate the bag support means about a central longitudinal axis to gently shake the filter bag supported thereby in a substantially lineal fashion. In addition, the present invention provides an improved manner for connecting the filter bags to the filter bag support means wherein tension of the filter bags can be readily varied with a minimum of parts and with a minimum of steps.

It is to be understood that various changes can be made in the arrangement, form and construction of the apparatus disclosed herein without departing from the scope or spirit of the present invention.

Referring to the drawing which discloses one advantageous embodiment of the present invention:

FIGURE 1 is a vertical, cross-sectional view of a dust collector apparatus embodying an inventive shaker mechanism;

FIGURE 2 is an enlarged, isometric view of a portion of a hollow cylindrical support member utilized in the apparatus of FIGURE 1, disclosing the manner in which the upper portion of filter bags are suspended from the support member; and FIGURE 3 is a portion of a bag tensioning shim which can be utilized with the support member of FIGURE 2.

Referring to FIGURE 1 of the drawing, the inventive dust collector apparatus includes filter bag housing 2 having at its lower portion upstream dirty gas inlet 3 and at its upper portion downstream clean gas outlet 4. Housing 2 is provided with horizontal partition 6 which extends transverse the housing and serves to divide the housing into dirty gas plenum 7 and clean gas plenum 8. Partition 6 is provided with tiers of spaced rows of spaced and aligned apertures 9 between dirty gas plenum 7 and clean gas plenum 8. It is to be understood that although only one aperture of each row is disclosed, there are successive spaced and aligned apertures in each of the aperture rows.

Disposed within clean gas plenum 8 so that the lower open portions thereof communicate with apertures 9 are pairs of spaced and aligned rows of filter bags 11, filter bags 11 having their upper end portions thereof closed. The bags 11 can be made from any one of a number of known, suitable filter fabric materials and advantageously a synthetic or glass cloth-like fabric can be utilized. It is to be understood that, like aperture rows 9, although only one filter bag of each row is disclosed, there are successive spaced and aligned filter bags in each row. It is to be noted that the upper portion of each filter bag 11 is provided with flexible connecting strap 12. Strap 12, which can be made from a suitably strong fabric material, is fastened at one end to a filter bag. Positioned at the other end of the strap opposite that end fastened to a bag is a plurality of grommeted apertures 13, these apertures serving to engage with pins extending from the cylindrical support members in a manner described hereinafter.

Rotatably mounted in clean gas plenum 8 of housing 2 above filter bags 11 are a plurality of spaced, parallel filter bag support members 14. These support members, which can be fabricated from a suitable lightweight metal, are advantageously hollow so as to be light in weight. It is to be noted that the central longitudinal axis of each support member 14 extends in a plane parallel to and intermediate a pair of spaced rows of filter bags 11 above the closed upper ends of the bags. Each support member 14 has a cross-sectional contour wherein at least the uppermost half section thereof is of semicircular shape and, in the disclosed embodiment, support members 14 are cylindrical with circular cross-sectional contours, the geometry of the member adding to its strength and rigidity. It is to be noted that the maximum chord or diameter, as the case may be, of the cross section of the support member advantageously should be substantially equal to the distance between the center lines of the rows of apertures 9 in partition 6. Each of support members 14 is provided with spaced sets of pin members 16 which are integral with the support member and extend therefrom from the upper half thereof. Pins 16 serve to receive grommeted apertures 13 of filter bags 11. Since the diameter of support member 14 is selected to be equal to the spacing between the center lines of the rows of apertures 9, the filter bags are held in aligned, vertical, parallel position with respect to each other.

To oscillate support members 14 so that filter bags 11 are shaken in a substantially gentle linear manner, an arm 17 is fixed to each support member in downwardly extending fashion therefrom to pivotally engage with a shaker bar 18. Each section shaker bar 18, in turn, is pivotally connected by another arm 19 to clevis 21 of a crank arm 22. Each crank arm 22 is pivotally connected to an eccentric 23 which can be driven in a suitable manner (not shown) to oscillate support members 14 a few degrees and thereby lower and raise the bags 11 in a gentle manner and in a linear fashion so as to shake the contaminant particles collected thereon with a minimum of contaminant re-entrainment thereon. It is to be noted that filter bags 11 are so dimensioned in length as to permit such linear shaking movement without undue stressing of the bag.

As can be seen in FIGURE 3, suitable apertured shim devices 26 of semicircular cross section can be provided. These shim devices are contoured to conform with the contour of support members 14 with apertures 27 thereof spaced to engage with pins 16 on support members 14. It only is necessary to mount a shim 26 on the upper surface of a bar 14 with the pins 16 in engagement with apertures 27 to increase the tension on filter bags 11 supported by bar 14.

From the foregoing description, it can be seen that a unique, uncomplicated structure can now be provided to shake filter bags in a lineal up and down fashion in an efficient manner with a minimum of re-entrainment and a minimum of bag wear.

The invention claimed is:

1. Dust collector apparatus comprising: a filter bag housing including upstream dirty gas inlet means and downstream clean gas outlet means; horizontal partition means extending transverse said housing to divide said housing into a dirty gas plenum communicating with said dirty gas inlet means of said housing and a clean gas plenum communicating with said clean gas outlet means of said housing; said partition means having at least one pair of spaced rows of spaced and aligned apertures between said dirty gas and clean gas plenums; at least one pair of spaced rows of spaced and aligned filter bags vertically disposed in said clean gas plenum in spaced parallel relationship, said filter bags having closed upper end portions and open lower end portions connected to said apertures of said partition to communicate with said dirty gas plenum; a bag support means having its central longitudinal axis extending in a plane parallel to and intermediate said pair of spaced rows of filter bags above the closed upper ends of said bags, said bag support means having a circular cross-sectional contour with a maximum chord substantially equal to the distance between center lines of said rows of apertures in said partition; means to connect the closed upper portions of said pair of spaced rows of filter bags to said support means along the uppermost half thereof; and means to rotate said bag support means about its central longitudinal axis in oscillatory fashion to shake said filter bags supported thereby only in a substantially gentle lineal up and down fashion.

2. The apparatus of claim 1, said bag support means comprising a hollow cylindrical tube with a cross-sectional diameter equal to the distance between center lines of said rows of apertures in said partition.

3. The apparatus of claim 1, said means to connect said filter bags to said support means comprising pin members fixed to and extending from the upper half of said support means and flexible straps, each fastened at one end to a filter bag and apertured at the other end to engage with said pin members of said support means.

4. The apparatus of claim 3, and apertured shim means having a semicircular cross section conforming with said support means to be removably engageable with the pin members of said support means so as to regulate the tension of said filter bags supported thereby.

References Cited

UNITED STATES PATENTS

| | | | |
|---|---|---|---|
| 1,835,093 | 12/1931 | Ruemelin | 55—305 |
| 2,167,236 | 7/1939 | Gieseler | 55—304 |
| 2,338,504 | 1/1944 | Foster | 55—381 X |
| 2,612,236 | 9/1952 | Vedder | 55—304 |
| 2,879,863 | 3/1959 | Snyder | 55—304 |
| 3,097,939 | 7/1963 | Schneider et al. | 55—378 |

HARRY B. THORNTON, *Primary Examiner.*

S. SOKOLOFF, *Assistant Examiner.*